United States Patent [19]
Gerling et al.

[11] Patent Number: 5,797,718
[45] Date of Patent: *Aug. 25, 1998

[54] FAN UNIT GENERATING GAS STREAMS

[75] Inventors: Dieter Gerling; Peter Lürkens, both of Aachen, Germany

[73] Assignee: U.S. Philips Corporation, New York, N.Y.

[21] Appl. No.: 565,740

[22] Filed: Nov. 30, 1995

[*] Notice: This patent issued on a continued prosecution application filed under 37 CFR 1.53(d), and is subject to the twenty year patent term provisions of 35 U.S.C. 154(a)(2).

[30] Foreign Application Priority Data

Dec. 9, 1994 [DE] Germany ............ 44 43 844.3

[51] Int. Cl.⁶ ............................................. F04B 49/06
[52] U.S. Cl. ........................ 417/44.11; 417/423.7; 310/62; 310/114
[58] Field of Search .............................. 417/44.11, 42, 417/420, 423.2, 423.7; 310/254, 261, 266, 53, 62, 63, 156, 114; 416/185, 186 R

[56] References Cited

U.S. PATENT DOCUMENTS

| | | | |
|---|---|---|---|
| 3,601,507 | 8/1971 | Harris | 417/354 |
| 3,602,745 | 8/1971 | Davis | 310/13 |
| 3,629,628 | 12/1971 | Rank | 310/54 |
| 4,007,386 | 2/1977 | Rustecki | 310/42 |
| 4,013,946 | 3/1977 | Lewis | 324/43 R |
| 4,111,615 | 9/1978 | Watanabe | 417/423.7 |
| 4,187,442 | 2/1980 | Hueschen et al. | 313/60 |
| 4,686,400 | 8/1987 | Fujisaki et al. | 310/67 R |
| 4,777,396 | 10/1988 | Ito et al. | 310/156 |
| 4,854,006 | 8/1989 | Nishimura et al. | 15/375 |
| 5,070,268 | 12/1991 | Phelon et al. | 310/153 |
| 5,176,509 | 1/1993 | Schmider et al. | 417/423.7 |
| 5,254,896 | 10/1993 | Bradfield et al. | 310/62 |
| 5,288,216 | 2/1994 | Bolte | 417/423 |
| 5,501,582 | 3/1996 | Gautier et al. | 417/420 |
| 5,574,321 | 11/1996 | Baker | 310/62 |

FOREIGN PATENT DOCUMENTS

0487141A2  5/1993  European Pat. Off. ....... F04D 25/06

Primary Examiner—Ayaz R. Sheikh
Assistant Examiner—Xuan M. Thai
Attorney, Agent, or Firm—Edward Blocker

[57] ABSTRACT

The invention relates to a fan unit for generating gas streams, in particular for vacuum cleaners, which unit comprises an impeller wheel (1) and a motor (4), which is a radial induction motor comprising an external stator (2) and an internal rotor (3), the stator (2) comprising a laminated core (2a) with coils (2b) arranged in slots, the rotor (3) comprising two concentric cylinders (3a, 3b), of which the outer cylinder (3b) is made of an electrically highly conductive material and the inner cylinder (3a) is made of a magnetically highly conductive material, one of the two axial end faces (3c) of at least one of the two rotor cylinders (3a, 3b) being in planar contact with the impeller wheel (1), the motor (4) being energised by means of a frequency changer (29 to 37) and the speed setting being derived from process-dependent nominal values and adjustable set-point values.

14 Claims, 1 Drawing Sheet

FAN UNIT GENERATING GAS STREAMS

BACKGROUND OF THE INVENTION

The invention relates to a fan unit for generating gas streams, in particular for vacuum cleaners, which unit comprises an impeller wheel and an induction motor comprising a stator and a rotor, the stator comprising a core with coils the impeller wheel being integrated with the rotor.

In conventional vacuum cleaners the impeller wheel is driven by a separate motor via a shaft, which motor is generally constructed as a universal motor. This construction has the disadvantage that it occupies a substantial mounting volume and that the necessity of brushes limits the maximum permissible speed.

EP 0 487 141 A2 (PHD 90-212) describes a fan unit in which the impeller wheel is integrated with the rotor is also electromagnetically active and in conjunction with electromagnetically active parts of the motor stator generates the torque of the impeller wheel via an air gap formed between radial surfaces of the impeller wheel and the motor stator. The motor is energized by means of a frequency changer and the speed setting is derived from process-dependent nominal values and adjustable set-point values. The construction of the fan unit has the following disadvantages:

The maximum power is limited by the diameter of the motor which is dictated by the impeller wheel, when the rotor of the motor breaks up rotor parts will be swung all around, the bearings are loaded by additional axial magnetic forces.

SUMMARY OF THE INVENTION

It is an object of the invention to provide a fan unit which has a smaller mounting volume and which can reach higher speeds than conventional units, whose maximum power is not limited by the given diameter, which has no axial magnetic forces and which cannot inflict harm on the user in the case the rotor of the drive motor breaks up.

According to the invention this object is achieved in that the rotor comprises two concentric cylinders, of which the outer cylinder is made of an electrically highly conductive material and the inner cylinder is made of a magnetically highly conductive material, one of the two axial end faces of at least one of the two rotor cylinders being in planar contact with the impeller wheel.

The construction described above results in a compact unit, whose speed is not limited by the presence of brushes. The maximum power can be increased by an axial extension of the motor section and in the case of breaking up of rotating motor parts the motor stator surrounding these parts acts as a shield. Moreover, the radial motor does not generate any axial magnetic forces.

In a further embodiment of the invention at least one of the two cylinders is substantially imperforate at one of its axial end faces, which imperforate end face adjoins an axial bounding surface of the impeller wheel. This provides a further increase of the rotor stability.

In a further embodiment of the invention the planar contact between the motor rotor and the impeller wheel is provided by the disc portion of the impeller wheel. This results in an even better integration of the drive motor and the impeller wheel.

In a further embodiment of the invention the electrically highly conductive material of the outer rotor cylinder is aluminium. This reduces the cylinder mass.

In a further embodiment of the invention the magnetically highly conductive material of the inner rotor cylinder is solid iron. This is the most economical construction for a magnetically conductive cylinder.

In a further embodiment of the invention the inner cylinder of a material of high magnetic conductivity consists either of axial laminations or of a coiled electric-sheet band. This suppresses eddy currents in the magnetically conductive cylinder, which improves the motor efficiency.

In a further embodiment of the invention the two rotor cylinders have different axial dimensions, the electrically conductive cylinder preferably having a larger axial dimension than the magnetically conductive cylinder. This has the advantage that the rotor resistance is reduced, which has a positive effect on the motor performance.

In a further embodiment of the invention the electrically conductive disc portion is made of aluminium. Since the impeller of a compressor is generally made of aluminium it is merely necessary to adapt the thickness to the requirements imposed by the power to be produced. Effective use is made of the properties of aluminium, i.e. a high mechanical strength, a low specific gravity and a high electrical conductivity.

In a further embodiment of the invention the set-point values are the primary frequency and the stator current or the stator voltage. Since the motor is energized by means of a frequency changer and the speed setting is derived from process-dependent nominal values and adjustable set-point values, the operating speed of the motor can be increased from 25,000 to 50,000 r.p.m. The high speed also enables the turbine efficiency to be improved. The adjustment possibilities allow the suction power to be optimised for a specific requirement. In addition, control is possible by means of additional pressure sensors.

In a further embodiment of the invention the set-point values are the primary frequency and the stator current or the stator voltage. Likewise, in a further embodiment the actual speed value is a measurement value or is derived from electrical parameters of the motor. By thus processing the operating functions in the radial induction motor it is possible to dispense with mechanical or electrical sensors.

BREIF DESCRIPTION OF THE DRAWINGS

The invention will now be described in more detail, by way of example, with reference to the drawings. In the drawings.

DETAILED DESCRIPTION OF THE PREFERRED EMBODIMENT

Figure 1:
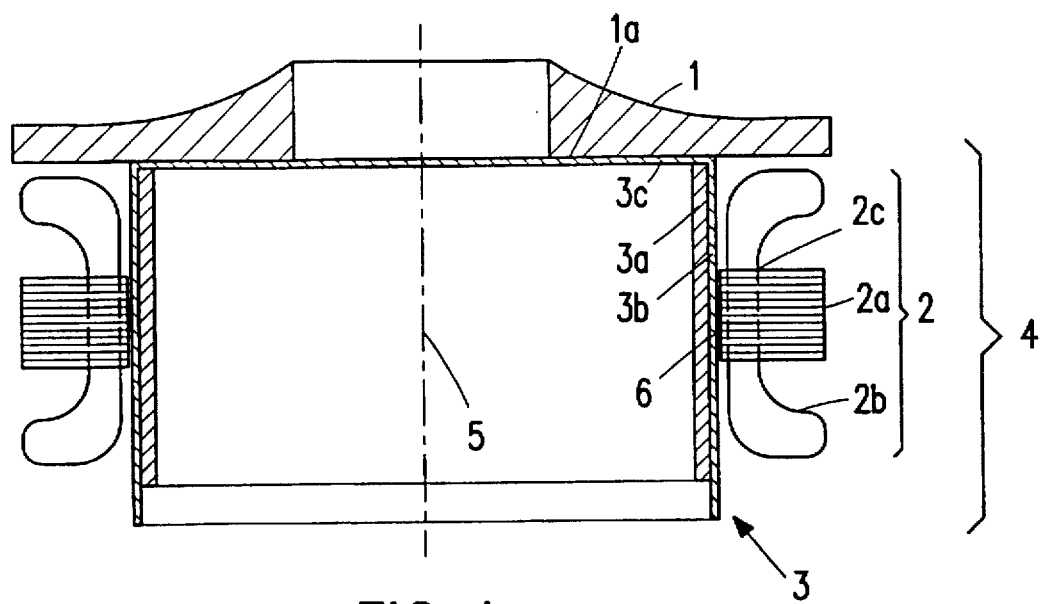
FIG. 1 is a sectional view of the fan unit.

The fan unit shown in sectional view in FIG. 1 comprises an impeller wheel 1 having a radial induction motor having a stator 2 and a rotor 3, spaced from the stator 2 by an air gap 6. The stator 2 comprises a stator laminated core 2a and the stator winding 2b. The rotor 3 comprises a magnetically conductive cylinder 3a, an electrically conductive cylinder 3b connected to the cylinder 3a, and a disc portion 3c which axially bounds the rotor 3 at an axial end. In the present radial-flux internal-rotor induction motor the stator is of conventional construction, i.e. a laminated core has slots 2c in which coils 2b are arranged. The two concentric cylinders 3a and 3b are spaced from the stator 2 by an air gap 6. The outer cylinder 3b, which faces the air gap 6, is made of a material having a high electrical conductivity, such as for example aluminium. The inner cylinder 3a is made of a material having a high magnetic conductivity, such as for example iron, which may be solid iron, laminated iron or coiled iron. The outer cylinder 3b has a greater axial length than the inner cylinder 3a.

In the embodiment shown in FIG. 1 the impeller wheel 1 is secured, in a manner not shown, to the disc portion 3c, which bounds the rotor axially. However, the impeller wheel 1 may alternatively have a separate metal bounding wall 1a connected to the disc portion 3c. The rotor 2 and the impeller wheel 1 may be journalled so that they are rotatable on a common axis 5 in a manner not shown.

Figure 2:
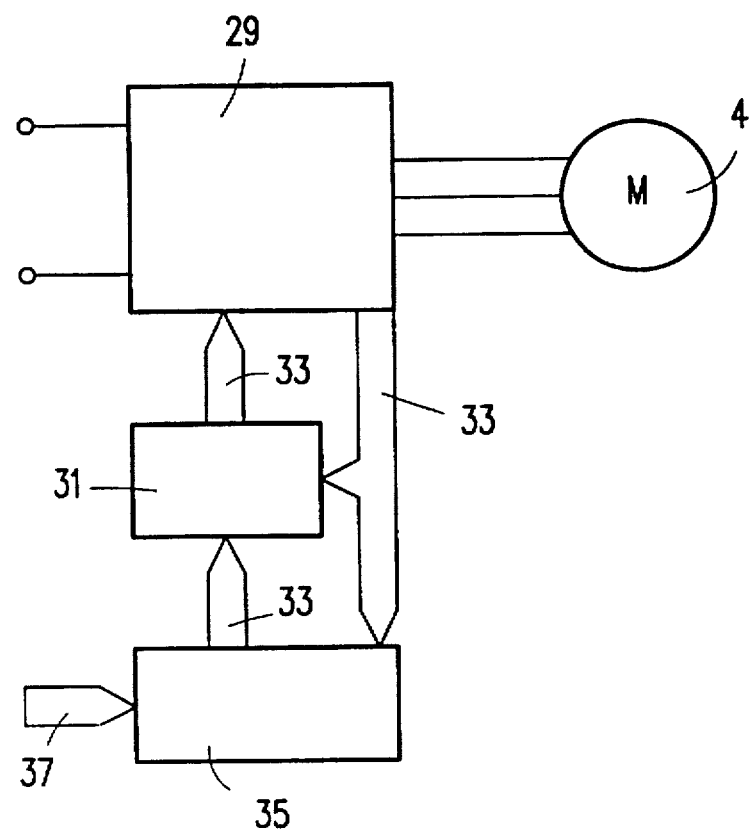
FIG. 2 is a block diagram of the power supply and control circuit of the radial induction motor in the fan unit shown in FIG. 1.

FIG. 2 shows a control circuit for the radial flux induction motor 4 shown in FIG. 1. It comprises a frequency changer 29 which energizes the winding of the motor 4. The speed setting is derived from process-dependent nominal values and adjustable set-point values. There is provided a signal shaper 31, which receives set-point or actual values in the form of the primary frequency as well as the stator current or the stator voltage via lines 33.

Moreover, it is possible to derive a speed setting and/or power setting from process-dependent nominal values and set-point values. The process controller 35 can derive actual values, for example for the speed and suction power, from electrical parameters. The nominal speed value can be preset on the process controller 35, for example by means of a manual control element 37; alternatively, it may be derived from a process sensor.

We claim:

1. A fan unit for generating gas streams, comprising:
   an impeller wheel integral with a rotor;
   an induction motor comprising a stator and the rotor;
   wherein the rotor comprises coaxial outer and inner cylinders connected together, at least one of the outer and inner cylinders having an axial end face; and,
   wherein the axial end face of at least one of the outer and inner cylinders is in planar contact with the impeller wheel.

2. The fan unit as set forth in claim 1, wherein the axial end face of at least one of the outer and inner cylinders is substantially imperforate and adjoins an axial bounding surface of the impeller wheel.

3. The fan unit as set forth in claim 1, wherein the axial end face of the at least one of the outer and inner cylinders which is in planar contact with the impeller wheel comprises a disc portion of the impeller wheel.

4. The fan unit as set forth in claim 1, wherein the outer cylinder is made of an electrically conductive material.

5. The fan unit as set forth in claim 1, wherein the inner cylinder is made of a magnetically conductive material.

6. The fan unit as set forth in claim 1, wherein the inner cylinder is comprised of a plurality of axially laminated sheets.

7. The fan unit as set forth in claim 1, wherein the inner cylinder comprises a coiled electric-sheet band.

8. The fan unit as set forth in claim 1, wherein the outer cylinder is longer than inner cylinder.

9. The fan unit as set forth in claim 1, wherein the motor has a speed setting which is derived from process-dependent nominal values and adjustable set-point values, and the fan unit further comprises a frequency changer for energizing the motor.

10. A fan, comprising:
    an impeller wheel integral with a rotor;
    an induction motor for rotatably driving the impeller wheel to generate a gas stream, the induction motor including a stator and the rotor separated from one another by an air gap; and,
    wherein the rotor is comprised of coaxial outer and inner cylinders connected together, with at least one of the outer and inner cylinders being secured to the impeller wheel for rotation therewith.

11. The fan as set forth in claim 10, wherein the outer cylinder is made of an electrically conductive material.

12. The fan as set forth in claim 11, wherein the inner cylinder is made of a magnetically conductive material.

13. The fan as set forth in claim 10, wherein at least one of the inner and outer cylinders includes an axial end face which is in planar contact with the impeller wheel.

14. The fan as set forth in claim 12, wherein at least one of the inner and outer cylinders includes an axial end face which is in planar contact with the impeller wheel.

* * * * *